US010699078B2

(12) United States Patent
Wei et al.

(10) Patent No.: US 10,699,078 B2
(45) Date of Patent: Jun. 30, 2020

(54) COMMENT-CENTERED NEWS READER

(71) Applicant: MICROSOFT TECHNOLOGY LICENSING, LLC, Redmond, WA (US)

(72) Inventors: Furu Wei, Beijing (CN); Ming Zhou, Beijing (CN); Yang Liu, Beijing (CN); Ziqiang Cao, Beijing (CN); Shaohan Huang, Beijing (CN); Li Dong, Beijing (CN); Lei Cui, Beijing (CN)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 15/578,195

(22) PCT Filed: May 29, 2015

(86) PCT No.: PCT/CN2015/080222
§ 371 (c)(1),
(2) Date: Nov. 29, 2017

(87) PCT Pub. No.: WO2016/191912
PCT Pub. Date: Dec. 8, 2016

(65) Prior Publication Data
US 2018/0150450 A1    May 31, 2018

(51) Int. Cl.
*G06F 17/27* (2006.01)
*G06F 17/24* (2006.01)
(Continued)

(52) U.S. Cl.
CPC ............ *G06F 40/295* (2020.01); *G06F 3/048* (2013.01); *G06F 40/134* (2020.01); *G06F 40/169* (2020.01); *G06F 40/216* (2020.01)

(58) Field of Classification Search
CPC ....... G06F 17/241; G06F 17/278; G06F 3/048
See application file for complete search history.

(56) References Cited

U.S. PATENT DOCUMENTS 8,806,320 B1 * 8/2014 Abdo ................... G06F 40/169
715/203
8,819,719 B1    8/2014 Chen et al.
(Continued)

FOREIGN PATENT DOCUMENTS

CN     101765840 A    6/2010
CN     103051513 A    4/2013
(Continued)

OTHER PUBLICATIONS

International Search Report and Written Opinion for PCT/CN2015/080222, dated Mar. 1, 2016.
(Continued)

*Primary Examiner* — Scott T Baderman
*Assistant Examiner* — Mario M Velez-Lopez
(74) *Attorney, Agent, or Firm* — Merchant & Gould P.C.

(57) ABSTRACT

Methods and systems for providing a comments-centered news reader. Configurations allow live comments to be presented along with the news or similar website content. While a user scrolls up and down in a browser presenting a news article on the user's computer device (e.g., mobile device), linked comments are shown in a selected region. The displayed comments automatically change to adapt to what parts (paragraphs, sentences) of the news article that user is currently reading. At the same time, users can publish their own comments without having to proceed to a separate section of the browser, thus saving the viewer actions and improving the user's experience. The user's system or a
(Continued)

remote server records the comments along with the article or the place users are in the article when the comment was entered.

19 Claims, 6 Drawing Sheets

(51) Int. Cl.
  *G06F 40/295* (2020.01)
  *G06F 40/134* (2020.01)
  *G06F 40/169* (2020.01)
  *G06F 40/216* (2020.01)
  *G06F 3/048* (2013.01)

(56) References Cited

U.S. PATENT DOCUMENTS

| | | | |
|---|---|---|---|
| 8,972,413 | B2 | 3/2015 | Lee et al. |
| 9,386,107 | B1* | 7/2016 | Browning ............ G06Q 50/01 |
| 2007/0118794 | A1* | 5/2007 | Hollander ............ G06F 16/954 |
| | | | 715/205 |
| 2007/0260564 | A1* | 11/2007 | Peters .................. G06F 40/279 |
| | | | 706/14 |
| 2010/0278453 | A1* | 11/2010 | King ..................... G06Q 10/10 |
| | | | 382/321 |
| 2012/0226996 | A1 | 9/2012 | Park et al. |
| 2013/0073545 | A1* | 3/2013 | Jain .................... G06F 16/9535 |
| | | | 707/732 |
| 2013/0091419 | A1 | 4/2013 | Caliman et al. |
| 2013/0332840 | A1* | 12/2013 | Roth ..................... G06F 3/0481 |
| | | | 715/738 |
| 2013/0332856 | A1* | 12/2013 | Sanders ............... G06F 16/176 |
| | | | 715/753 |
| 2014/0033015 | A1 | 1/2014 | Shaver |
| 2014/0052540 | A1* | 2/2014 | Rajaram ............ G06Q 30/0255 |
| | | | 705/14.66 |
| 2014/0094241 | A1 | 4/2014 | Guinn et al. |
| 2014/0181694 | A1 | 6/2014 | Barman |
| 2014/0280236 | A1 | 9/2014 | Faller et al. |
| 2014/0298201 | A1 | 10/2014 | Tsui et al. |
| 2014/0344359 | A1* | 11/2014 | Broz ....................... H04L 67/10 |
| | | | 709/204 |
| 2015/0149502 | A1* | 5/2015 | Rao ..................... G06Q 10/107 |
| | | | 707/770 |
| 2015/0261853 | A1* | 9/2015 | Shao .................. G06F 17/30905 |
| | | | 707/722 |
| 2015/0381555 | A1 | 12/2015 | Faller et al. |
| 2016/0171111 | A1* | 6/2016 | Kraft .................. G06F 16/9535 |
| | | | 707/706 |
| 2016/0246769 | A1 | 8/2016 | Screen et al. |
| 2016/0269345 | A1 | 9/2016 | Weizman |
| 2016/0277328 | A1* | 9/2016 | Ishizuka ................. G06F 13/00 |
| 2018/0159804 | A1 | 6/2018 | Wei et al. |
| 2018/0322188 | A1 | 11/2018 | Zhou et al. |

FOREIGN PATENT DOCUMENTS

| | | |
|---|---|---|
| CN | 103412920 A | 11/2013 |
| CN | 103581280 A | 2/2014 |
| CN | 103853761 A | 6/2014 |
| CN | 104504131 A | 4/2015 |
| CN | 104571818 A | 4/2015 |
| CN | 104820704 A | 8/2015 |
| CN | 104981792 A | 10/2015 |
| WO | 2008/031625 A2 | 3/2008 |
| WO | 2014/086224 A1 | 6/2014 |

OTHER PUBLICATIONS

"Search report Issued in European Patent Application No. 15893576. 7", dated Dec. 19, 2018, 8 Pages.
Delort, Jean Yves., "Identifying Commented Passages of Documents Using Implicit Hyperlinks", In Proceedings of the Seventeenth Conference on Hypertext and Hypermedia, Aug. 22, 2006, 11 pages.
Ma, et al., "Opinion target extraction in Chinese News Comments", In Proceedings of the 23rd International Conference on Computational Linguistics: Posters, Aug. 23, 2010, pp. 782-790.
"International Search Report and Written Opinion Issued in PCT Application No. PCT/CN2015/080223", dated Feb. 25, 2016, 11 Pages.
"International Search Report & Written Opinion Issued in PCT Application No. PCT/US2016/058810", dated Dec. 14, 2016, 10 Pages.
Vo, et al., "FBK-TR: Applying SVM with Multiple Linguistic Features for Cross-Level Semantic Similarity", In Proceedings of the 8th International Workshop on Semantic Evaluation, Aug. 2014, pp. 284-288.
"Search Report Issued in European Patent Application No. 15893577. 5", dated Jan. 22, 2019, 10 Pages.
"Office Action Issued in European Patent Application No. 15893576. 7", dated Apr. 8, 2019, 8 Pages.
"First Office Action and Search Report Issued in Chinese Pate Application No. 201510728069.0", dated Jul. 24, 2019, 14 Pages.
"First Office Action and Search Report Issued in Chinese Pate Application No. 201580043166.4", dated Jul. 29, 2019, 15 Pages.
"The Research and Implementation of QA Techniques Based on Forum Data", In Chinese Doctor Dissertation and Master Thesis of Information Science and Technology, May 15, 2015, 75 Pages.
"Non Final Office Action Issued in U.S. Appl. No. 15/578,203", dated Oct. 22, 2019, 12 Pages.
"Office Action Issued in European Patent Application No. 15893577. 5", dated Jan. 2, 2020, 6 Pages.
"Second Office Action Issued in Chinese Patent Application No. 201510728069.0", dated Feb. 7, 2020, 11 Pages.
"Non Final Office Action Issued in U.S. Appl. No. 15/578,203", dated Apr. 13, 2020, 12 Pages.
"Non Final Office Action Issued in U.S. Appl. No. 15/772,472", dated Mar. 30, 2020, 11 Pages.
"Office Action Issued in Chinese Patent Application No. 201510728069. 0", dated Apr. 15, 2020, 6 Pages.
"Office Action Issued in Chinese Patent Application No. 201580043166. 4", dated Mar. 20, 2020, 6 Pages.

* cited by examiner

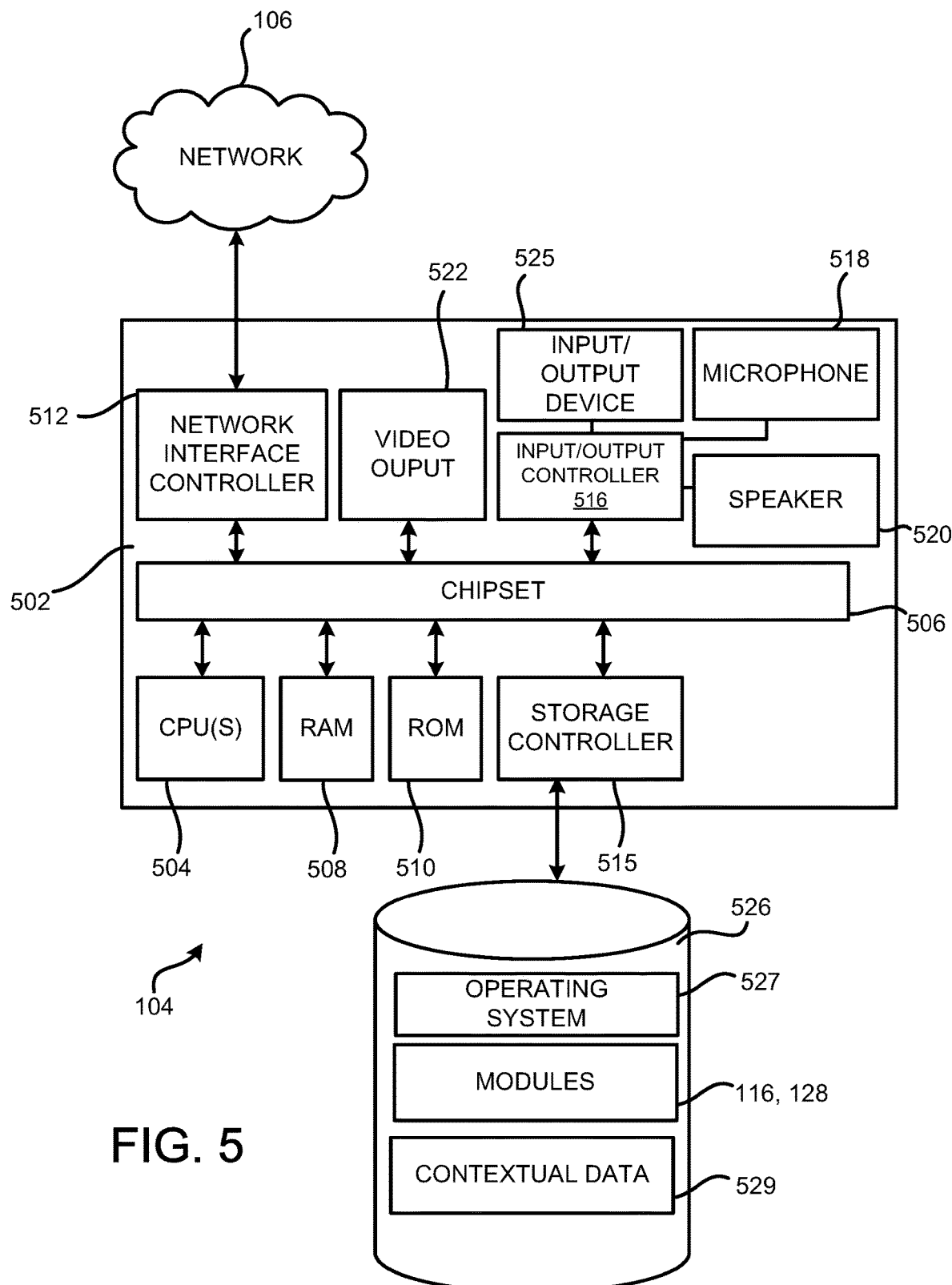

COMMENT-CENTERED NEWS READER

CROSS-REFERENCE TO RELATED APPLICATION

This application is a U.S. National Stage Application of PCT/CN2015/080222, filed May 29, 2015, which application is hereby incorporated by reference. To the extent appropriate, a claim of priority is made to the above disclosed application.

BACKGROUND

There exist many websites that produce news and opinion articles. In some of the websites, users can publish comments about certain news articles. However, the news content and the corresponding comments are often separated or unlinked. Also, in most scenarios, users must scroll to a different area from the news in order to read others' comments or post their own comments.

Other news websites that allow for commenting require that the users must first manually select a word or phrase from the presented news article before they post their comment(s). This adds a burden to a user, thus diminishing the user's experience.

SUMMARY

Technologies are described herein for providing comment and content linking and presentation techniques.

Configurations disclosed herein allow live comments to be presented along with the news or similar website content. A computing device connected to a network receives content including text. The content originates from one or more content source connected to the network. The computing device receives one or more comments previously associated with the content, the comments having origination at one of the computing device or other computing devices connected to the network. Then, at least a portion of the received content is presented in a first section of a display device of the computer device. The computing device determines which of the received comments to present based at least on the portions of the content currently presented in the first section of the display device and presents the determined comments in a second section of the display device.

Configurations disclosed allow users to more easily view/read other comments during reading of a news article and allow users to post comments about certain parts of the article without having to actively designate the certain part of the article. This provides a more intuitive interactive user experience for providing comments. This reduces the burden to a user, thus increasing the user's efficiency and experience.

It should be appreciated that the above-described subject matter may be implemented as a computer-controlled apparatus, a computer process, a computing system, or as an article of manufacture, such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s), as permitted by the context described above and throughout the document.

BRIEF DESCRIPTION OF THE DRAWINGS

The detailed description is described with reference to the accompanying figures. In the figures, the leftmost digit of a reference number identifies the figure in which the reference number first appears. The same reference numbers in different figures indicate similar or identical items.

FIG. 5 is a computer architecture diagram showing an illustrative computer hardware and software architecture, for a computing device, capable of implementing aspects of the configurations presented herein.

DETAILED DESCRIPTION

Overview

Examples described herein provide constructs of a system having a host server that provides linking of comments to specific locations within network-accessible content, such as a news article. The system also has a client-side component for presenting content with linked comments.

Various examples, scenarios, and aspects are described further with reference to FIGS. 1-5.

Illustrative Environment

Figure 1:
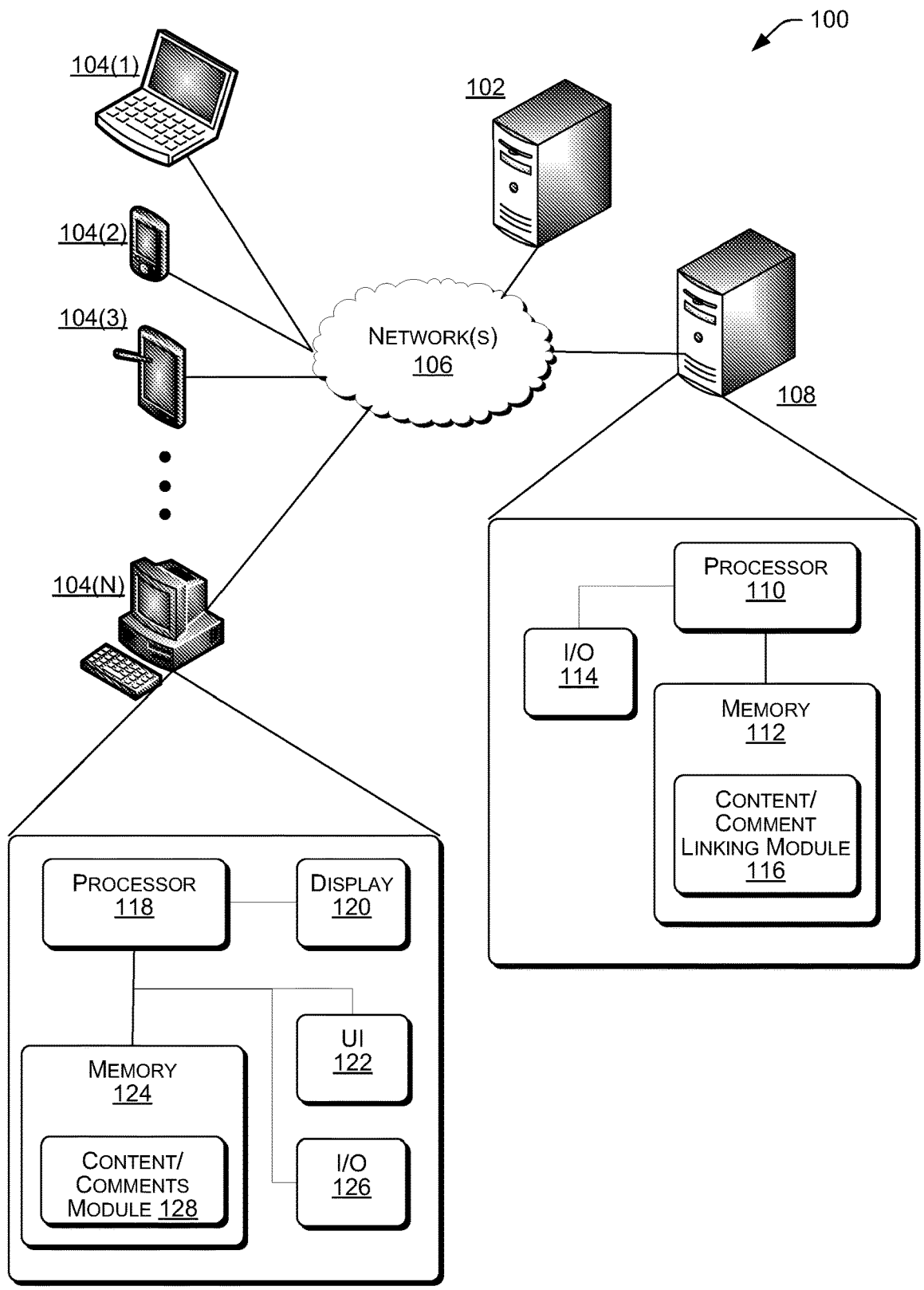
FIG. 1 is a diagram depicting an example environment for implementing news-reading and comment-linking applications.

FIG. 1 illustrates an example environment for implementing a comments-centered news reader. The comments-centered news reader presents comments (recent and past) according to what part of received content (e.g., news articles) the user is currently interacting with (e.g., reading, watching, listening, sensing, etc.).

In an example, a network-based system 100 includes one or more content servers 102, a plurality of client computing devices 104(1-N), and one or more content/comment-linking servers 108. The content servers 102, the client computing devices 104(1-N), and the content/comment-linking servers 108 are all in communication across one or more data networks 106.

The network(s) 106 can include public networks, such as the Internet, private networks, such as an institutional and/or personal intranet, or some combination of private and public networks. The network(s) 106 can also include any type of wired and/or wireless network, including but not limited to local area networks (LANs), wide area networks (WANs), satellite networks, cable networks, Wi-Fi networks, WiMax networks, mobile communications networks (e.g., 3G, 4G, and so forth), or any combination thereof. The network(s) 106 can utilize communications protocols, including packet-based and/or datagram-based protocols such as Internet protocol (IP), transmission control protocol (TCP), user datagram protocol (UDP), or other types of protocols. Moreover, the network(s) 106 can also include a number of devices that facilitate network communications and/or form a hardware basis for the networks, such as switches, routers, gateways, access points, firewalls, base stations, repeaters, backbone devices, and the like.

In example scenarios, the servers 102, 108 can include one or more computing devices that operate in a cluster or other grouped configuration to share resources, balance load, increase performance, provide fail-over support or redundancy, or for other purposes. The servers 102, 108 can belong to a variety of categories or classes of devices, such as traditional server-type devices, desktop computer-type devices, mobile-type devices, special-purpose-type devices, embedded-type devices, and/or wearable-type devices. Thus, although illustrated as tower computers, the servers 102, 108 can include a diverse variety of device types and are not limited to a particular type of device. The servers 102, 108 can represent, but are not limited to, desktop computers, server computers, web-server computers, personal computers, mobile computers, laptop computers, tablet computers, wearable computers, implanted computing devices, telecommunication devices, automotive computers, network-enabled televisions, thin clients, terminals, personal data assistants (PDAs), game consoles, gaming devices, work stations, media players, personal video recorders (PVRs), set-top boxes, cameras, integrated components for inclusion in a computing device, appliances, or any other sort of computing device.

In some examples, the content/comments-linking servers 108 can include at least a processor 110, memory 112, and an input/output (I/O) device 114. The memory 112 may include at least a content/comments-linking module 116. The content/comments-linking module 116, when executed by the processor 110, causes reception of comments generated by users at any of the devices 104(1-N) and reception of information regarding the content that was the target of the comments. The execution of content/comments-linking module 116 by the processor 110 causes linking of the received comments to specific portions of the associated content.

The client devices 104(1-N) include at least a processor 118, a display 120, a user interface 122, memory 124, and an I/O device 126. The memory 124 may store a content/comments module 128 that, when executed by the processor 118, receives content from a specific content server 102 and linked comment information related to the links from the content/comments-linking server 108. Based on knowledge of what content is currently being presented on the display 120 and the received linked comment information, the processor 118, executing other components of the content/comments module 128, presents the comments previously linked to the currently presented content. Also, the processor 118, while executing other components of the content/comments module 128, may present a comments area on the display 120. The comments area can receive a user's comments related to the presented content. Received comments may be linked to specific portions of the content at the content/comments-linking server 108 or at the client device 104 if the client device 104 includes the content/comments-linking module 116. Examples of other components of the client devices 104 are shown in FIG. 5.

The functions provided by the modules 116, 128 may be located at other computing locations on the network or may be distributed across multiple computing locations on the network.

Figure 2A:
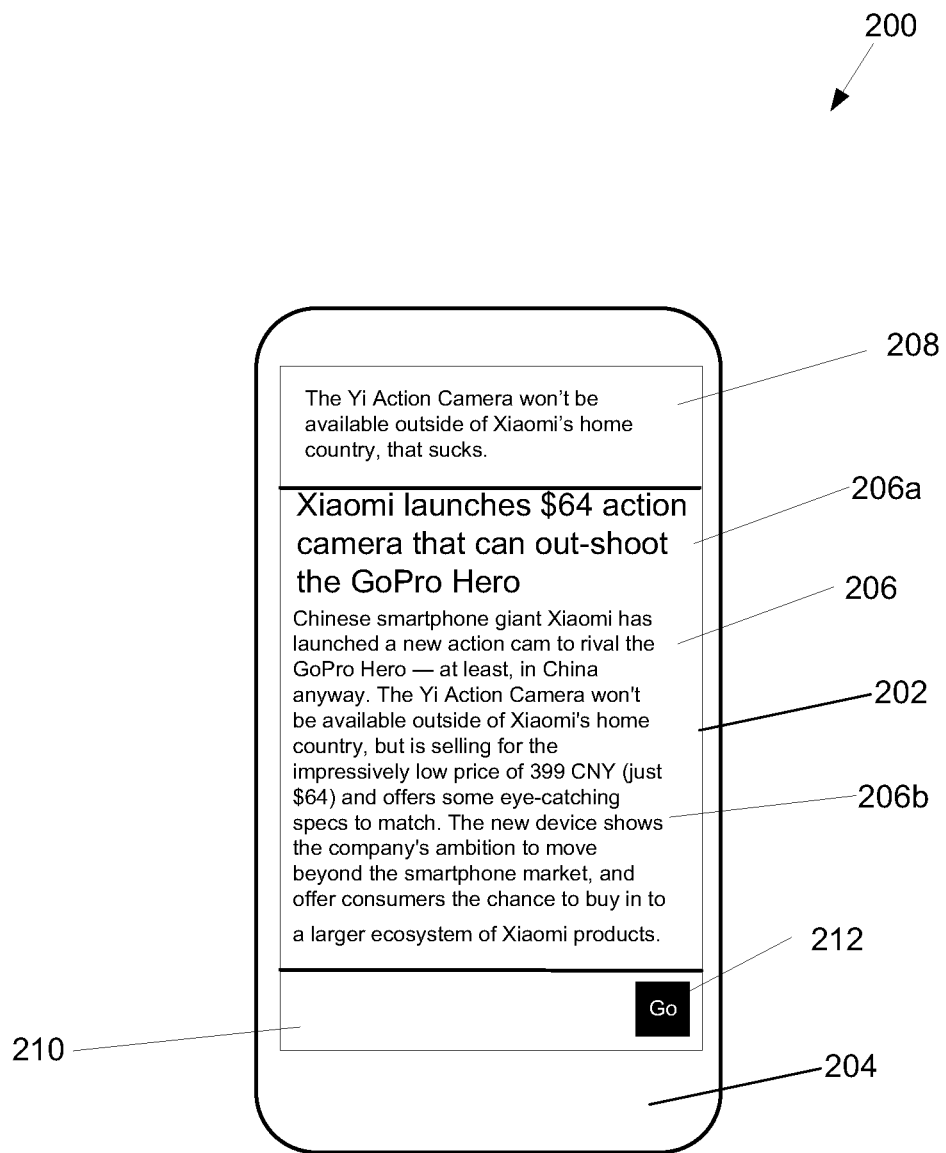
FIGS. 2A-B show different instances of an example mobile device enabled to present content and comments, based on the functions provided by components of the system shown in FIG. 1.

FIG. 2A shows an example of the client device 104 implemented as a mobile device 200 (i.e., smartphone, personal data assistant, etc.). The mobile device 200 includes a display 202 and may include user interface controls 204. The content/comments module 128 causes the processor 118 to present information regarding content and comments on the display 202 by communicating with the content server 102 and/or the content/comment-linking server(s) 108, as necessary. The processor 118, while executing components of the content/comments module 128, presents content from the content server 102 based on a user's request. An example of a user's request for content may include entry of a news source website address into a browser (not shown) presented on the display 202. The requested content (e.g., a news article webpage) is partially presented within a content presentation area 206 of the display 202.

The presented content may include a title and a body. In this example, the title is presented in a title section 206a of the content presentation area 206. The body of the content is presented in a body section 206b of the content presentation area 206.

The display 202 includes a comments area 208. The comments area 208 may be a selected area that shows past and live comments. The comments area 208 may be presented above, below, or adjacent the content presentation area 206 when viewed by a user. The content/comments module 128 may cause the processor 118 to maintain an open communications link with the entity (e.g., the content/comments-linking server 108) that is linking comments to the currently presented content in the content presentation area 206. The entity may be other client devices 104(1-N), if those other devices include the content/comments-linking module 116. This open communications link allows comments from other user to be linked, sent, then presented live or in near real time on the display 202. Thus, only those comments that were previously linked or will be linked to the content currently displayed in the content presentation area 206 are presented in the comments area 208. The selection of these comments will be determined by the current position that users are interacting with the content (which sentences are shown on the screen).

If the number of comments exceeds a threshold or the size of a comment or a group of comments exceeds a size value of the comments area 208, the linked comments will scroll horizontally or vertically. The scrolling may occur automatically or in response to a user's action of the user interface controls 204 or the display 202 (if the display includes touchscreen components).

The sentences of the content presented in the content presentation area 206 having linked comments may be highlighted or shown in a way unique from those sentences that do not have a linked comment(s).

The display 202 may also include a comment entry area 210. The comment entry area 210 includes a comment input box for allowing users to publish their own comments. The user may associate a comment with content or with the presented content within the content presentation area 206 by activating a Go button 212 or comparable activation mechanism after the user has entered a comment into the comment input box of the comment entry area 210. Upon entry of a comment into the comment entry area 210, the entered comment and content information are sent to the content/comments-linking server 108. Alternately, the content/comments module 128, when stored in the memory 124, causes the processor 118 to link the comment to a certain sentence/phrase within the content.

Figure 2B:
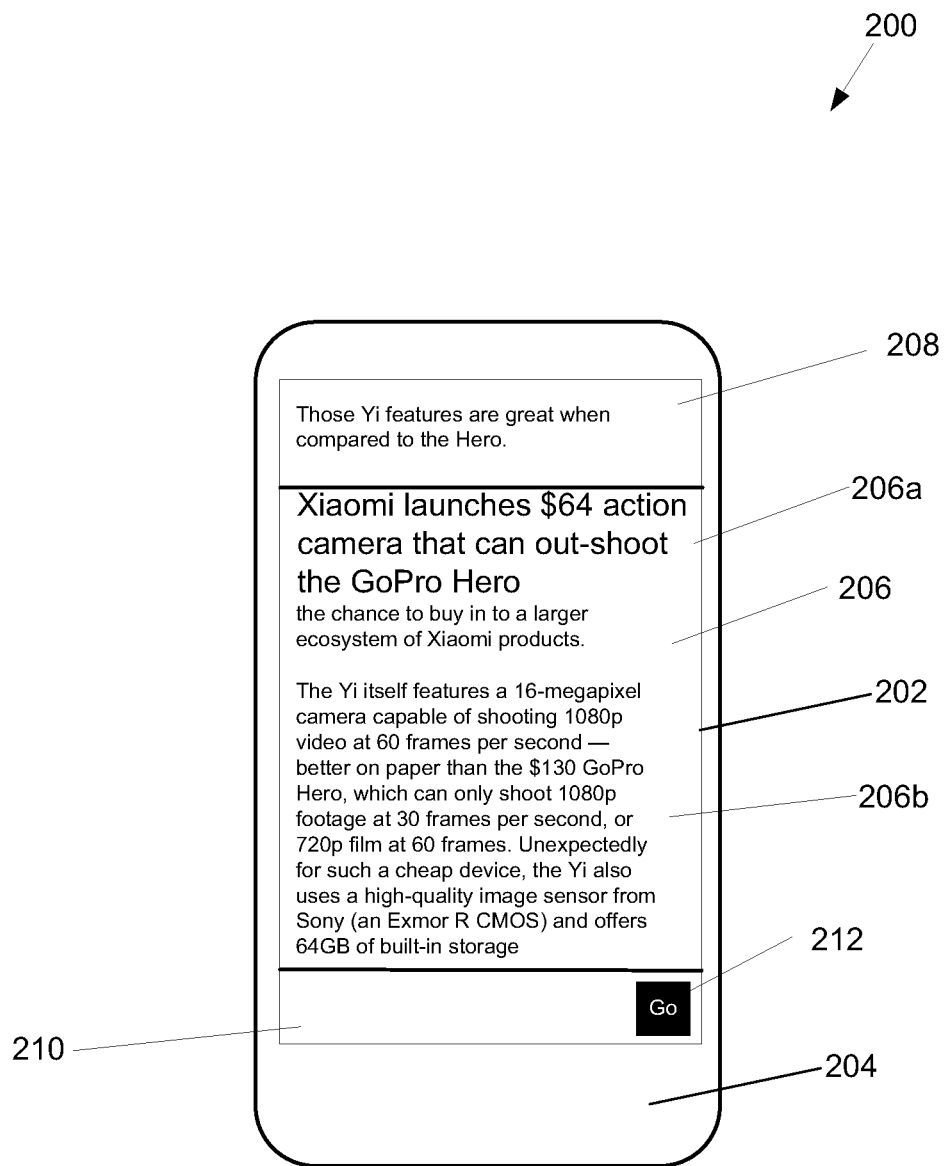

FIG. 2B shows the client device 104 after the user has scrolled the article in the body section 206*b*. Because a different portion of the article now appears in the body section 206*b*, the client device 104 scrolls the comments area 208 to show a comment that was identified as being linked to a sentence that now appears in the body section 206*b*.

The comments are automatically linked to sentences of the content in a classification framework, which includes training a model based on a set of comment/sentence pairs. A training set of extracted features from sample comments and sentences is first created. The training set may use many different comments previously associated with many different content postings. The training set is used to train a classifier for classifying instances using natural language-processing techniques. This is described as follows:

Given a content item $S=\{s_1, s_2, \ldots, s_n\}$ (s=sentence) with a comments set $C=\{c_1, c_2, \ldots, c_m\}$, the candidate comment-sentence pairs $T=\{t_{11}, t_{12}, \ldots, t_{mn}\}$ are obtained by computing the Cartesian product of these two sets.

Lexical-level, entity-level, and topic-level features are extracted from the obtained pairs. A feature vector $v(t_{pq})$ is created from the extracted features for each $c_p$ and $s_q$ of the training pair $t_{pq}$.

A category of $t_{pq}$ is assigned to be $y_{pq}=1$ and any other pairs $t_{pq}'=<c_p, s_o>$, where $o \neq q$ are assigned to be $y_{po}=0$. Training instances $<t, y>$ are inputted into a support vector machine (SVM) classifier that learns a weight value for each pair.

For a new comment-sentence pair, the SVM classifier can be used to predict the possibility of the pair being true after features have been extracted for the pair.

Examples of extracted lexical features are listed in Table 1.

TABLE 1

Extracted Features

| | |
|---|---|
| Lexical-level | cosine similarity |
| | Average number of word matches |
| | Average number of stem matches |
| | Average number of Part-of-Speech matches |
| | Average number of function word matches |
| Entity-level | Average number of entity-type matches |
| | Average number of entity matches (for each type) |
| Topic-level | LDA topic vector cosine similarity |

The lexical features include the cosine similarity between a sentence and a comment represented as two Tf-idf vectors. Tf-idf means term-frequency times inverse document-frequency. The lexical features also include the number of common words, stems, part-of-speech (POS) tags, and function words. The function words include the verbs and the nouns because they are the most important word types.

The entity level features are computed with the number of common entity types and the number of common entities within each type. All the lexical-level and entity-level numbers are averaged by the length of the associated content sentence. The topic-level features are based on a latent Dirichlet allocation (LDA) analysis of the comments and sentences. After LDA, a topic vector is generated for each comment or sentence, where each dimension means a latent topic in the text. A cosine similarity of the comment and sentence topic vectors is determined. This represents the semantic similarity between comments and content sentences.

The lexical features are used to generate feature vectors. A person managing this training operation applies weights the feature vectors of each pair, based on the person's perception of whether the pair is a likely link. The weighted pairs are applied to a modeler/classifier, such as an SVM classifier, which creates a model/classifier for linking comments to sentences.

Illustrative Processes

The processes 300-400 are illustrated as a collection of blocks in logical flow graphs, which represent a sequence of operations that may be implemented in hardware, software, or a combination thereof. In the context of software, the blocks represent computer-executable instructions stored on one or more computer-readable storage media that, when executed by one or more processors, perform the recited operations. Computer-executable instructions may include routines, programs, objects, components, data structures, and the like that perform particular functions or implement particular abstract types of data. The order in which the operations are described is not intended to be construed as a limitation, and any number of the described blocks may be combined in any order and/or in parallel to implement the illustrated process. One or more of the processes described herein may occur independently or in relation in any order, whether in series or parallel.

The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer-implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special-purpose digital logic, and any combination thereof.

Figure 3:
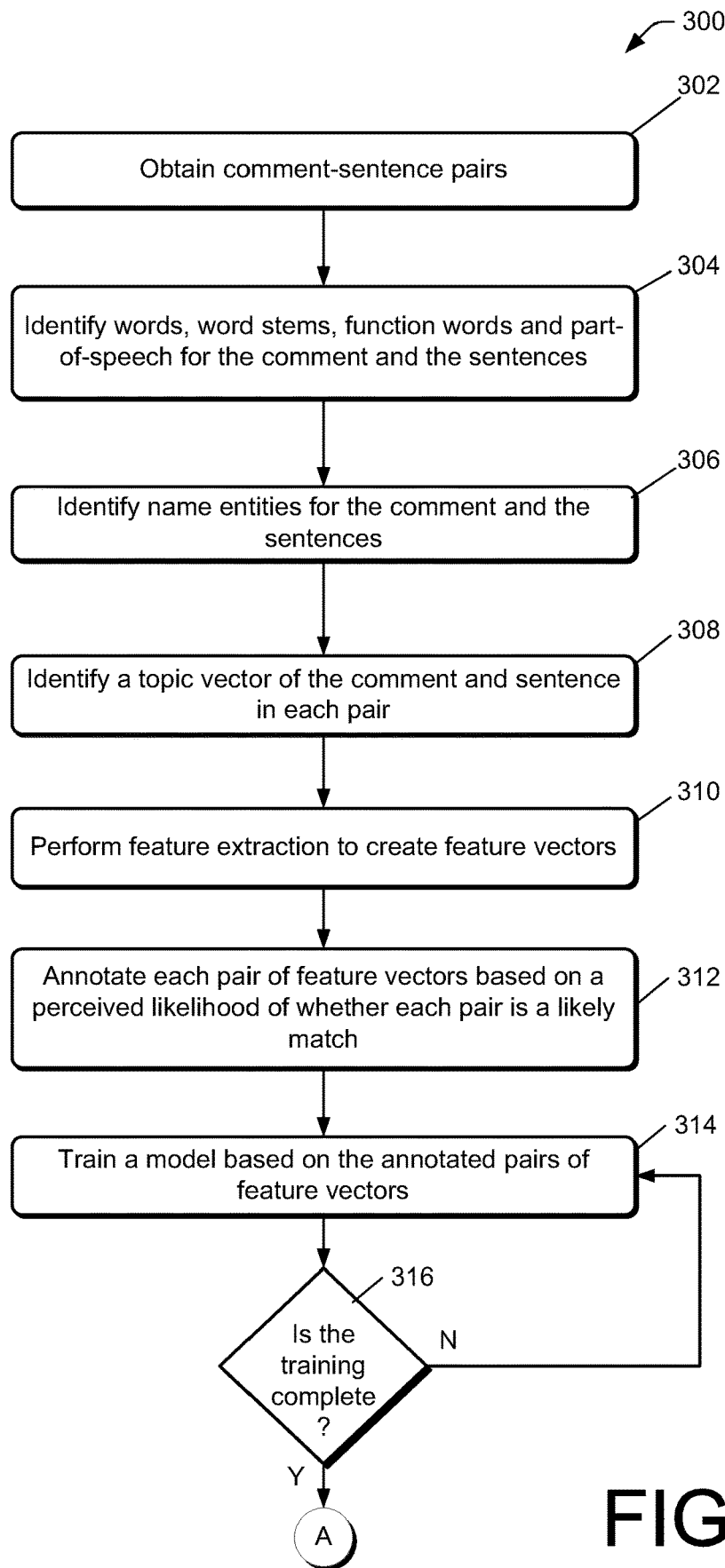
FIG. 3 is a flow diagram depicting an example operation of a process for training a news/comment-linking and presentation system.

FIG. 3 illustrates a high-level process 300 for training a linking model for use in an autolinking process. The process 300 is a specific implementation using natural language processing (NLP) techniques. First at a block 302, a set of comment-sentence pairs is obtained from training comments and sentences. The set of pairs may be obtained for various genres, for example, world news, local news, sports, opinion, food, entertainment, music, etc. Using different genre sets of pairs results in different genre training models. When using a training model associated with a genre similar to currently viewed content, the process of linking a comment to the content may produce more accurate linked results.

Next, at a block 304, words, word stems, function words, and parts-of-speech (POS) for the comment and the sentences are identified for both items of each pair.

At a block 306, name entities for the comment and the sentence of each pair are identified. Examples of named objects include Eiffel tower, President Lincoln, and Adagio for Strings.

Then, at a block 308, a topic vector of each comment/sentence pair is identified. Identification of a topic includes finding abstract topics in the text. In natural language processing, a topic model is a type of statistical model for discovering abstract topics that may occur in a collection of documents. Intuitively, given that a document is about a particular topic, one would expect particular words to appear in the document more or less frequently. A document typically concerns multiple topics in different proportions. The topic model is captured in a mathematical framework—a topic vector that includes the proportions of words in the respective sentence that is associated with each of multiple topics.

Then, at a block 310, features are extracted based on the topic vectors, name entities, and other details found at block 304. The result of the feature extraction produces feature vectors for the comment and sentence in each comment/sentence pair.

At a block 312, a trainer annotates each pair of feature vectors based on a perceived likelihood of whether each pair is a match. This annotation may be in the form of a weight value assigned to the pair of feature vectors.

At a block 314, a model or classifier is trained based on the annotated pairs of feature vectors. In one example, an SVM generates the model or classifier based at least on the annotated pairs of feature vectors.

Figure 4:
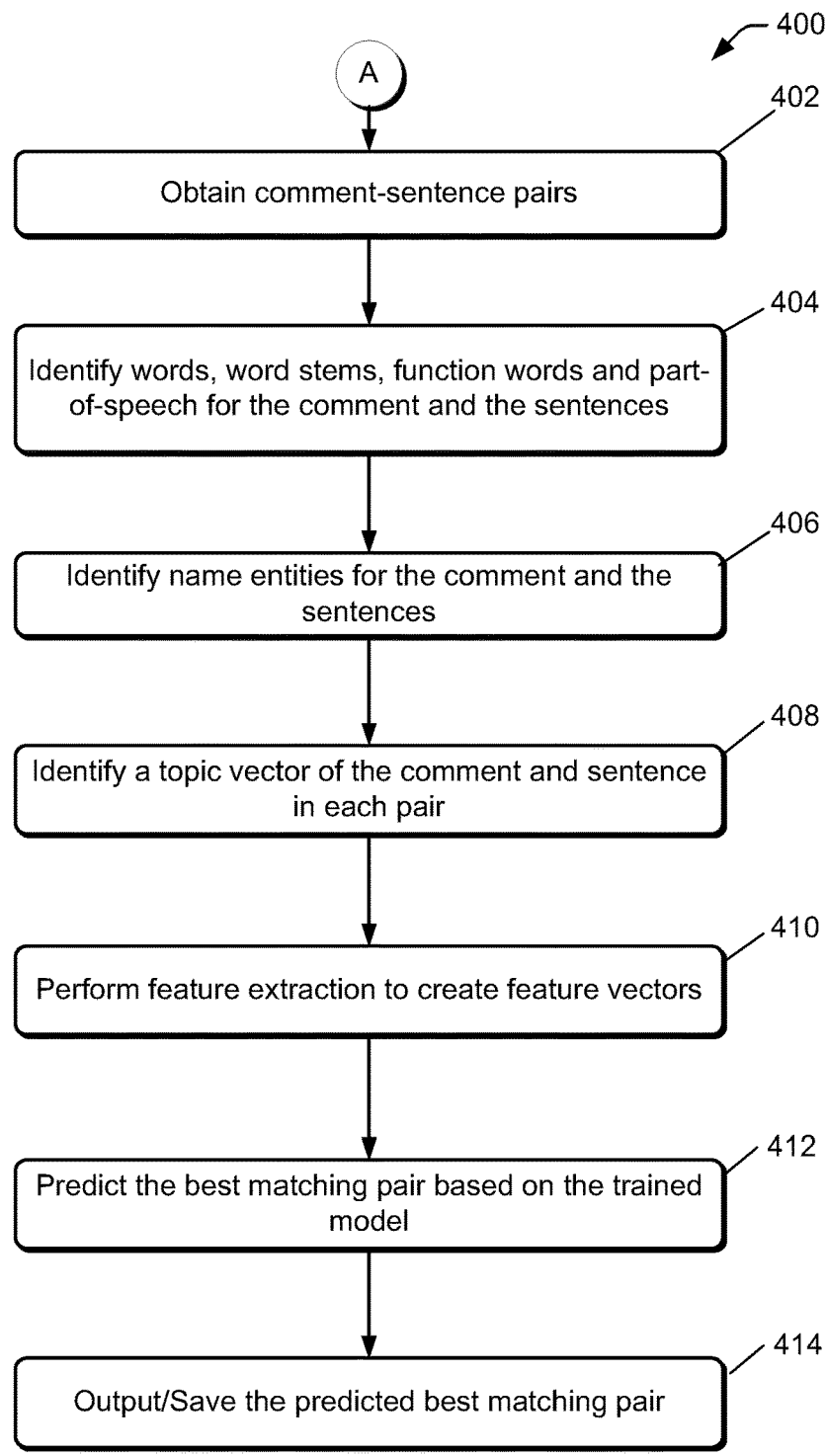
FIG. 4 shows a flow diagram depicting an example operation of a process for predicting links between comments and news content.

At a decision block 316, once the training is determined to be complete, the process 300 is ready for analyzing and linking actual comments to content sentences, see process 400 in FIG. 4.

FIG. 4 illustrates a high-level process 400 for automatically linking a comment to one sentence included in the content. The steps shown in blocks 402-410 are similar to those shown in blocks 302-310 of FIG. 3, except that only one content and one comment are used.

First, at a block 402, a set of comment-sentence pairs is obtained from the entered comment and the sentences of a defined content.

Next, at a block 404, words, word stems, function words, and POS for the comment and the sentence are identified for both items of each pair.

At a block 406, name entities for the comment and the sentence of each pair are identified.

Then, at a block 408, a topic vector of each comment/sentence pair is identified. The topic vectors, like those in the training process 300, may be limited in size. Limiting the size of the topic vectors reduces the time and cost associated with this linking process.

Then, at a block 410, features are extracted based on the topic vectors. The result of the feature extraction produces feature vectors for the comment and sentence in each comment/sentence pair.

At a block 412, a prediction of whether each comment/sentence pair is the best match is determined, based on a comparison with the trained model of FIG. 3. The result is that one of the sentences of the content is determined to be the best match/link for the entered comment.

Then, at a block 414, the comment is linked to the identified best matching/linking sentence. This identified link is outputted for future use by the components of the system 100, such as the content/comments module 128.

The following shows an example of a comment/content sentence pair and the associated analysis.

Comment:
GoPro has some cool products, but it seems like they would be really easy to knock off. A rugged camera isn't rocket science.

Sentence from content:
The Yi itself features a 16-megapixel camera capable of shooting 1080p video at 60 frames per second—better on paper than the $130 GoPro Hero, which can only shoot 1080p footage at 30 frames per second, or 720p film at 60 frames.

First, each sentence in the pair is stemmed, tokenized, and POS tagged (the bold words are POS tags):

NNP GoPro VBZ has DT some JJ cool NNS products, CC but PRP it VBZ seems IN like PRP they MD would VB be RB really JJ easy TO to VB knock RP off DT A JJ rugged NN camera VBZ is RB n't NN rocket NN science.

DT The NNP Yi PRP itself VBZ features DT a JJ 16-megapixel NN camera JJ capable IN of VBG shooting NN 1080p NN video IN at CD 60 NNS frames IN per JJ second NN-JJR better IN on NN paper IN than DT the NN $130 NNP GoPro NNP Hero, WDT which MD can RB only VB shoot NN 1080p NN footage IN at CD 30 NNS frames IN per JJ second, CC or NN 720p NN film IN at CD 60 NNS frames.

The following list is an example of POS tags:
CC Coordinating conjunction
CD Cardinal number
DT Determiner
EX Existential there
FW Foreign word
IN Preposition or subordinating conjunction
JJ Adjective
JJR Adjective, comparative
JJS Adjective, superlative
LS List item marker
MD Modal
NN Noun, singular or mass
NNS Noun, plural
NNP Proper noun, singular
NNPS Proper noun, plural
PDT Predeterminer
POS Possessive ending
PRP Personal pronoun
PRP$ Possessive pronoun
RB Adverb
RBR Adverb, comparative
RBS Adverb, superlative
RP Particle
SYM Symbol
TO to
UH Interjection
VB Verb, base form
VBD Verb, past tense
VBG Verb, gerund or present participle
VBN Verb, past participle
VBP Verb, non3rd person singular present
VBZ Verb, 3rd person singular present
WDT Wh-determiner
WP Wh-pronoun
WP$ Possessive wh-pronoun
WRB Wh-adverb Next, the sentences are analyzed to find the name entities. The result in the comment is: [GoPro]. The result in the content sentence is: [Yi, GoPro, Hero].

In this example, the number of topics is selected at five. The following is the topic vector for a topic model of the sentence:

[0.1, 0.1, 0.4, 0.3, 0.1]

And for the comment:

[0.2, 0, 0.2, 0.5, 0.1]

Each dimension of these vectors is associated with an abstract topic and its value equates to the proportions of the words of the comment or sentence that are associated with the abstract topic.

Then, features are extracted from the comment and sentence of the pair, based on the above analyses to get feature vectors for the sentence and the comment of each pair:

$F_{sentence}$ $F_{comment}$

Assuming training has already occurred, these feature vectors, along with feature vectors of all the other comment/content sentence pairs, are analyzed with regard to the trained model/classifier (trained SVM classifier) to determine which of the sentences is to be identified as the link for the comment.

Although the above example is directed to linking text comments to text sentences, implementations of this invention could be applied to audible comments and audio and/or video content. Voice to text may be used as a technique for converting voice to text that is then used by this invention. Video analysis technologies may be used to identify events (e.g., change events) in video and then using that information as a basis for linking to comments.

FIG. 5 shows additional details of an example of computer architecture for the components shown in FIG. 1 that is capable of executing the program components described above for providing a comments-centered news reader and linking system. The computer architecture shown in FIG. 5 illustrates a game console, conventional server computer, workstation, desktop computer, laptop, tablet, phablet, network appliance, personal digital assistant ("PDA"), e-reader, digital cellular phone, or other computing device, and may be utilized to execute any of the software components presented herein. For example, the computer architecture shown in FIG. 5 may be utilized to execute any of the software components described above. Although some of the components described herein are specific to the client device 104, it can be appreciated that such components, and other components may be part of the server 108.

The client device 104 includes a baseboard 502, or "motherboard," which is a printed circuit board to which a multitude of components or devices may be connected by way of a system bus or other electrical communication paths. In one illustrative configuration, one or more central processing units ("CPUs") 504 operate in conjunction with a chipset 506. The CPUs 504 may be standard programmable processors that perform arithmetic and logical operations necessary for the operation of the client device 104.

The CPUs 504 perform operations by transitioning from one, discrete, physical state to the next, through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 506 provides an interface between the CPUs 504 and the remainder of the components and devices on the baseboard 502. The chipset 506 may provide an interface to a RAM 508, used as the main memory in the client device 104. The chipset 506 may further provide an interface to a computer-readable storage medium, such as a read-only memory ("ROM") 510 or nonvolatile RAM ("NVRAM") for storing basic routines that help to start up the client device 104 and to transfer information between the various components and devices. The ROM 510 or NVRAM may also store other software components necessary for the operation of the client device 104 in accordance with the configurations described herein.

The client device 104 may operate in a networked environment using logical connections to remote computing devices and computer systems, through a network, such as the local area network 106. The chipset 506 may include functionality for providing network connectivity through a network interface controller (NIC) 512, such as a gigabit Ethernet adapter. The NIC 512 is capable of connecting the client device 104 to other computing devices over the network 106. It should be appreciated that multiple NICs 512 may be present in the client device 104, connecting the computer to other types of networks and remote computer systems. The network 106 allows the client device 104 to communicate with remote services and servers, such as the servers 102, 108.

The client device 104 may be connected to a mass storage device 526 that provides nonvolatile storage for the computing device. The mass storage device 526 may store system programs, application programs, other program modules, and data, which have been described in greater detail herein. The mass storage device 526 may be connected to the client device 104 through a storage controller 515 connected to the chipset 506. The mass storage device 526 may consist of one or more physical storage units. The storage controller 515 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units. It should also be appreciated that the mass storage device 526, other storage media, and the storage controller 515 may include multimedia card (MMC) components, eMMC components, secure digital (SD) components, PCI Express components, or the like.

The client device 104 may store data on the mass storage device 526 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 526 is characterized as primary or secondary storage, and the like.

For example, the client device 104 may store information to the mass storage device 526 by issuing instructions through the storage controller 515 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The client device 104 may further read information from the mass storage device 526 by detecting the physical states or characteristics of one or more particular locations within the physical storage units.

In addition to the mass storage device 526 described above, the client device 104 may have access to other computer-readable media to store and retrieve information, such as program modules, data structures, or other data. Thus, although the program module 116, 128 and other modules are depicted as data and software stored in the mass storage device 526, it should be appreciated that these components and/or other modules may be stored, at least in part, in other computer-readable storage media of the client device 104. Although the description of computer-readable media contained herein refers to a mass storage device, such as a solid-state drive, a hard disk or CD-ROM drive, it should be appreciated by those skilled in the art that computer-readable media can be any available computer storage media or communication media that can be accessed by the client device 104.

Communication media include computer-readable instructions, data structures, program modules, or other data in a modulated data signal, such as a carrier wave or other transport mechanism, and includes any delivery media. The term "modulated data signal" means a signal that has one or more of its characteristics changed or set in a manner so as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

By way of example, and not limitation, computer storage media may include volatile and nonvolatile, removable and nonremovable media implemented in any method or technology for storage of information, such as computer-readable instructions, data structures, program modules, or other data. For example, computer media includes, but is not limited to, RAM, ROM, EPROM, EEPROM, flash memory or other solid-state memory technology, CD-ROM, digital versatile disks ("DVD"), HD-DVD, BLU-RAY, or other optical storage, magnetic cassettes, magnetic tape, magnetic disk storage or other magnetic storage devices, or any other medium that can be used to store the desired information and which can be accessed by the client device 104. For purposes of the claims, the phrase "computer storage medium," and variations thereof, does not include waves or signals per se and/or communication media.

The mass storage device 526 may store an operating system 527 utilized to control the operation of the client device 104. According to one configuration, the operating system comprises a gaming operating system. According to another configuration, the operating system comprises the WINDOWS®, UNIX™ ANDROID™, WINDOWS® PHONE, or iOS™ operating systems, available from their respective manufacturers. It should be appreciated that other operating systems may also be utilized. The mass storage device 526 may store other system or application programs and data utilized by the client device 104, such as the program modules 116, 128, contextual data 529, and/or any of the other software components and data described above. The mass storage device 526 might also store other programs and data not specifically identified herein.

In one configuration, the mass storage device 526 or other computer-readable storage media is encoded with computer-executable instructions which, when loaded into the client device 104, transform the computer from a general-purpose computing system into a special-purpose computer capable of implementing the configurations described herein. These computer-executable instructions transform the client device 104 by specifying how the CPUs 504 transition between states, as described above. According to one configuration, the client device 104 has access to computer-readable storage media storing computer-executable instructions, which, when executed by the client device 104, perform the various routines described above with regard to FIG. 5 and the other figures. The client device 104 might also include computer-readable storage media for performing any of the other computer-implemented operations described herein.

The client device 104 may also include one or more input/output controllers 516 for receiving and processing input from a number of input devices, such as a keyboard, a mouse, a microphone, a headset, a touchpad, a touch screen, an electronic stylus, or any other type of input device. Also shown, the input/output controller 516 is in communication with an input/output device 525. The input/output controller 516 may provide output to a display, such as a computer monitor, an HMD, a flat-panel display, a digital projector, a printer, a plotter, or other type of output device. The input/output controller 516 may provide input communication with other devices, such as a microphone 518, a speaker 520, game controllers, and/or audio devices. In addition, or alternatively, a video output 522 may be in communication with the chipset 506 and operate independent of the input/output controllers 516. It will be appreciated that the client device 104 may not include all of the components shown in FIG. 5, may include other components that are not explicitly shown in FIG. 5, or may utilize an architecture completely different from that shown in FIG. 5.

EXAMPLE CLAUSES

Clause 1: A computer-implemented method comprising: receiving, at a computing device connected to a network, content comprising text, the content originating from one or more content source connected to the network; receiving, at the computing device, one or more comments previously associated with the content, the comments having origination at one of the computing device or other computing devices connected to the network; presenting at least a portion of the received content in a first section of a display device of the client computer device; determining which of the received comments to present based at least on the portions of the content currently presented in the first section of the display device; and presenting the determined comments in a second section of the display device.

Clause 2: The computer-implemented method of clause 1, further comprising: receiving user entered text as a comment in the third section of the display device; and sending via the network the received comment and information relating to the content to a comment/contents-linking device.

Clause 3: The computer-implemented method of clauses 1-2, wherein the content comprises a news article webpage or a posting webpage.

Clause 4: The computer-implemented method of clauses 1-3, wherein the one or more content sources comprise a server associated with a news service.

Clause 5: The computer-implemented method of clauses 1-4, further comprising: identifying sentences of the content having previously linked comments; and presenting the sentences of the content identified as having linked comments in a manner different from sentences of the content that do not have any linked comments.

Clause 6: The computer-implemented method of clauses 1-5, wherein presenting the content identified as having linked comments comprises highlighting at least a portion of the sentences of the content having the linked comments.

Clause 7. The computer-implemented method of clauses 1-6, further comprising: in response to determining which of the received comments are to be presented, determining whether the number of comments to be presented exceeds a threshold number; and if the number of comments exceeds the threshold number, automatically scrolling the comments within the second section.

Clause 8: The computer-implemented method of clause 7, wherein the scrolling comprises at least one of horizontally or vertically scrolling the presented comments within the second section.

Clause 9: The computer-implemented method of clauses 1-6, further comprising: in response to determining which of the comments is to be presented, determining if an amount of text or characters in the to-be-presented comments exceeds a threshold number; and if the amount of text or characters exceeds the threshold number, automatically scrolling the comments within the second section.

Clause 10: The computer-implemented method of clause 9, wherein the scrolling comprises at least one of horizontally or vertically scrolling the presented comments within the second section.

Clause 11: A computing device comprising: a processor; a display device; and a computer-readable storage medium in communication with the processor, the computer-readable storage medium having computer-executable instructions stored thereupon that, when executed by the processor, cause the computer to: receive content comprising text, the content originating from one or more content sources connected to the network; receive one or more comments previously associated with the content, the comments having origination at one of the computing device or other computing devices connected to the network; present at least a portion of the received content in a first section of a display device of the client computer device; determine which of the received comments to present based at least on the determined portions of the received content currently presented in the first section of the display device; and present the determined comments at a second section of the display device.

Clause 12: The computing device of clause 11, wherein the computer-readable storage medium has further computer-executable instructions stored thereon that cause the computer to: receive user entered text as a comment in the third section of the display device; and send via the network the received comment and information relating to the received content to a comment/contents-linking device.

Clause 13: The computing device of clauses 11-12, wherein the content comprises a news article or posting.

Clause 14: The computing device of clauses 11-13, wherein the one or more content sources comprise a news server.

Clause 15: The computing device of clauses 11-14, wherein the computer-readable storage medium has further computer-executable instructions stored thereon that cause the computer to: identify sentences of the content having linked comments; and present the sentences identified as having linked comments in a manner different from sentences of the content that do not have any linked comments.

Clause 16: The computing device of clauses 11-15, wherein presenting the content identified as having linked comments comprises highlighting at least a portion of the sentences of the content having the linked comments.

Clause 17: The computing device of clauses 11-16, wherein the computer-readable storage medium has further computer-executable instructions stored thereon that cause the computer to: in response to determining which of the received comments is to be presented at the second section, determining whether the number of comments to be presented exceeds a threshold number; and if the number of comments exceeds the threshold number, automatically scrolling the comments within the second section, wherein the scrolling comprises at least one of horizontally or vertically scrolling the presented comments within the second section.

Clause 18: The computing device of clauses 11-16, wherein the computer-readable storage medium has further computer-executable instructions stored thereon that cause the computer to: in response to determining which of the comments is to be presented at the second section, determining whether an amount of text or characters in the to-be-presented comments exceeds a threshold number; and if the amount of text or characters exceeds the threshold number, automatically scrolling the comments within the second section.

Clause 19: The computing device of clause 18, wherein the scrolling comprises at least one of horizontally or vertically scrolling the presented comments within the second section.

Clause 20: A computer-readable storage medium having computer-executable instructions stored thereon that, when executed by a computer, cause the computer to: receive content comprising text, the content originating from one or more content sources connected to the network; receive one or more comments previously associated with the content, the comments having origination at one of the computing device or other computing devices connected to the network; present at least a portion of the received content in a first section of a display device of the mobile device; determine which of the received comments is to be presented at a second section of the display device, based at least on the determined portions of the received content currently presented in the first section of the display device; present the determined comments; receive user entered text as a comment in the third section of the display device; and send via the network the received comment and information relating to the received content to a comment/contents-linking device.

CONCLUSION

Although the techniques have been described in language specific to structural features and/or methodological acts, it is to be understood that the appended claims are not necessarily limited to the features or acts described. Rather, the features and acts are described as example implementations of such techniques.

The operations of the example processes are illustrated in individual blocks and summarized with reference to those blocks. The processes are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations. Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple suboperations, and/or executed in parallel to implement the described processes. The described processes can be performed by resources associated with one or more device(s), such as one or more internal or external CPUs or GPUs, and/or one or more pieces of hardware logic, such as FPGAs, DSPs, or other types of accelerators.

All of the methods and processes described above may be embodied in, and fully automated via, software code modules executed by one or more general-purpose computers or processors. The code modules may be stored in any type of computer-readable storage medium or other computer storage device. Some or all of the methods may alternatively be embodied in specialized computer hardware.

Any routine descriptions, elements, or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions may be deleted, or executed out of order from that shown or discussed, including substantially synchronously or in reverse order, depending on the functionality involved, as would be understood by those skilled in the art. It should be emphasized that many variations and modifications may be made to the above-described examples, the elements of which are to be understood as being among other acceptable examples. All such modifications and variations are intended to be included herein within the scope of this disclosure and protected by the following claims.

What is claimed is:

1. A computer-implemented method comprising:
receiving, at a computing device connected to a network, content comprising a plurality of text segments, the content originating from one or more content sources connected to the network;
receiving, at the computing device, a plurality of comments previously associated with the content, the comments having origination at one of the computing device or other computing devices connected to the network;
presenting a portion of the received content including a first text segment in a first section of a display device of the computer device;
determining one or more comments of the plurality of received comments to present based at least on a topic identified from the first text segment presented in the first section of the display device, wherein a topic identified from the one or more comments is linked to the topic identified from the first text segment presented in the first section of the display device and wherein the topic identified from the one or more comments is linked to a plurality of text segments within the content;
determining whether the number of comments linked to the topic identified from the first text segment exceeds a threshold number; and
if the number of comments exceeds the threshold number, presenting the one or more comments in a second section of the display device by automatically scrolling, within the second section, the one or more comments linked to the topic identified from the first text segment.

2. The computer-implemented method of claim 1, further comprising: receiving user entered text as a comment in a third section of the display device; and sending via the network the received comment and information relating to the content to a comment/contents-linking device.

3. The computer-implemented method of claim 1, wherein the content comprises a news article webpage or a posting webpage.

4. The computer-implemented method of claim 3, wherein the one or more content sources comprise a server associated with a news service.

5. The computer-implemented method of claim 1, further comprising: identifying sentences of the content having previously linked comments; and presenting the sentences of the content identified as having linked comments in a manner different from sentences of the content that do not have any linked comments.

6. The computer-implemented method of claim 5, wherein presenting the content identified as having linked comments comprises highlighting at least a portion of the sentences of the content having the linked comments.

7. The computer-implemented method of claim 1, wherein the scrolling comprises at least one of horizontally or vertically scrolling the presented comments within the second section.

8. The computer-implemented method of claim 1, further comprising: in response to determining the one or more comments to be presented, determining if an amount of text or characters in the determined one or more comments to be presented exceeds a threshold number; and if the amount of text or characters exceeds the threshold number, automatically scrolling the one or more comments within the second section.

9. The computer-implemented method of claim 8, wherein the scrolling comprises at least one of horizontally or vertically scrolling the presented comments within the second section.

10. A computing device comprising:
a processor;
a display device; and
a computer-readable storage medium in communication with the processor, the computer-readable storage medium having computer-executable instructions stored thereupon that, when executed by the processor, cause the computing device to:
receive content comprising a plurality of text segments, the content originating from one or more content sources connected to a network;
receive a plurality of comments previously associated with the content, the comments having origination at one of the computing device or other computing devices connected to the network;
present a portion of the received content including a first text segment in a first section of a display device of the computer device;
determine one or more comments of the plurality of received comments to present based on a topic identified from the first text segment presented in the first section of the display device, wherein a topic identified from the one or more comments is linked to the topic identified in the first text segment presented in the first section of the display device and wherein the topic identified from the one or more comments is linked to a plurality of text segments within the content; and
present the determined comments at a second section of the display device, wherein at least one comment of the determined comments is linked to the topic identified in the first text segment in near real-time and then presented in near real-time.

11. The computing device of claim 10, wherein the computer-readable storage medium has further computer-executable instructions stored thereon that cause the computing device to: receive user entered text as a comment in the third section of the display device; and send via the network the received comment and information relating to the received content to a comment/contents-linking device.

12. The computing device of claim 10, wherein the content comprises a news article or posting.

13. The computing device of claim 12, wherein the one or more content sources comprise a news server.

14. The computing device of claim 10, wherein the computer-readable storage medium has further computer-executable instructions stored thereon that cause the computing device to: identify sentences of the content having linked comments; and present the sentences identified as having linked comments in a manner different from sentences of the content that do not have any linked comments.

15. The computing device of claim 14, wherein presenting the content identified as having linked comments comprises highlighting at least a portion of the sentences of the content having the linked comments.

16. The computing device of claim 10, wherein the computer-readable storage medium has further computer-executable instructions stored thereon that cause the computing device to: in response to determining the one or more comments to be presented at the second section, determining whether the number of comments to be presented exceeds a threshold number; and if the number of comments exceeds the threshold number, automatically scrolling the one or more comments within the second section, wherein the scrolling comprises at least one of horizontally or vertically scrolling the presented comments within the second section.

17. The computing device of claim 10, wherein the computer-readable storage medium has further computer-executable instructions stored thereon that cause the computing device to: in response to determining the one or more comments to be presented at the second section, determining whether an amount of text or characters in the determined one or more comments to be presented exceeds a threshold number; and if the amount of text or characters exceeds the threshold number, automatically scrolling the one or more comments within the second section.

18. The computing device of claim 17, wherein the scrolling comprises at least one of horizontally or vertically scrolling the presented comments within the second section.

19. A computer-readable storage medium having computer-executable instructions stored thereon that, when executed by a computer, cause the computer to:
receive content comprising a plurality of text segments, the content originating from one or more content sources connected to a network;
receive a plurality of comments previously associated with the content, the comments having origination at one of a computing device or other computing devices connected to the network;
present a portion of the received content including a first text segment in a first section of a display device of a mobile device;
determine one or more comments of the plurality of received comments is to be presented at a second section of the display device, based on a topic identified from the first text segment presented in the first section of the display device, wherein a topic identified from one or more comments is linked to the topic identified from the first text segment presented in the first section of the display device and wherein the topic identified from the one or more comments is linked to a plurality of text segments within the content;
present the determined comments at a second section of the display device;
receive user entered text as a comment in a third section of the display device; and
send, via the network, the user entered text and information relating to the user entered text to a comment/contents-linking device such that the user entered text may be linked to one or more portions of the received content.

* * * * *